US012509135B2

(12) United States Patent
Oshima et al.

(10) Patent No.: US 12,509,135 B2
(45) Date of Patent: Dec. 30, 2025

(54) CART

(71) Applicant: HONDA MOTOR CO., LTD., Tokyo (JP)

(72) Inventors: Ritsuya Oshima, Saitama (JP); Hiroshi Iwakami, Saitama (JP); Makoto Hasegawa, Saitama (JP); Hiroshi Gomi, Saitama (JP); Noriyuki Ishida, Saitama (JP); Shinichiro Kobashi, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 784 days.

(21) Appl. No.: 17/874,590

(22) Filed: Jul. 27, 2022

(65) Prior Publication Data
US 2023/0029719 A1 Feb. 2, 2023

(30) Foreign Application Priority Data

Jul. 29, 2021 (JP) ................. 2021-124310

(51) Int. Cl.
B62B 5/00 (2006.01)
B60B 19/00 (2006.01)
B62B 5/06 (2006.01)

(52) U.S. Cl.
CPC .......... *B62B 5/0069* (2013.01); *B60B 19/003* (2013.01); *B62B 5/06* (2013.01)

(58) Field of Classification Search
CPC ....... B62B 5/0073; B62B 5/0069; B62B 5/06; B60B 19/003
USPC ...................................... 180/19.3
See application file for complete search history.

(56) References Cited

U.S. PATENT DOCUMENTS

| 5,746,282 A | * | 5/1998 | Fujiwara | ............. B60L 15/2009 180/6.5 |
| 10,906,573 B2 | * | 2/2021 | Chung | .................. B62B 5/0073 |
| 2012/0155616 A1 | | 6/2012 | Rijken et al. | |
| 2015/0209204 A1 | | 7/2015 | Hsu et al. | |

(Continued)

FOREIGN PATENT DOCUMENTS

| JP | H08282498 A | 10/1996 |
| JP | H0986413 A | 3/1997 |

(Continued)

OTHER PUBLICATIONS

EPO Extended European Search Report for EP Patent Application 22187401.9 dated Dec. 23, 2022; 7 pp.

(Continued)

*Primary Examiner* — Christopher B Wehrly
(74) *Attorney, Agent, or Firm* — Armstrong Teasdale LLP

(57) ABSTRACT

A cart includes a vehicle body, at least one omnidirectional wheel provided at the vehicle body and configured to move the vehicle body in all directions along a floor, a drive unit configured to drive the omnidirectional wheel, a handle provided at the vehicle body and configured to accept an operation by a user, at least one sensor configured to detect loads in a width direction and a front-and-rear direction of the vehicle body applied to the handle, and a control unit configured to control the drive unit based on the loads detected by the sensor, wherein the handle includes a first portion extending in the width direction and at least one second portion extending in a front-and-rear direction.

10 Claims, 9 Drawing Sheets

(56) References Cited

U.S. PATENT DOCUMENTS

| | | | |
|---|---|---|---|
| 2016/0137216 A1* | 5/2016 | Nilsson | B62B 3/001 |
| | | | 701/1 |
| 2020/0352815 A1 | 11/2020 | Raja | |
| 2021/0229723 A1* | 7/2021 | Sa | B62B 3/14 |

FOREIGN PATENT DOCUMENTS

| | | |
|---|---|---|
| JP | H1045000 A | 2/1998 |
| JP | 2002002488 A | 1/2002 |
| JP | 2007022342 A | 2/2007 |
| JP | 2013503778 A | 2/2013 |
| JP | 2014018383 A | 2/2014 |

OTHER PUBLICATIONS

Notice of Reasons for Refusal for Japanese Patent Application No. 2022-118741, dated Oct. 28, 2025; 10 pp.

* cited by examiner

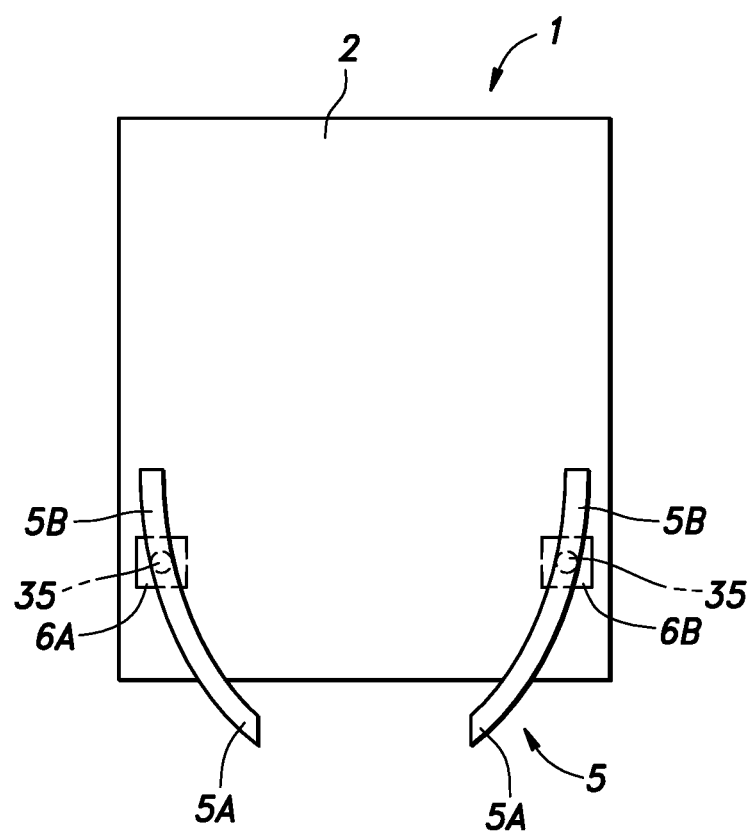

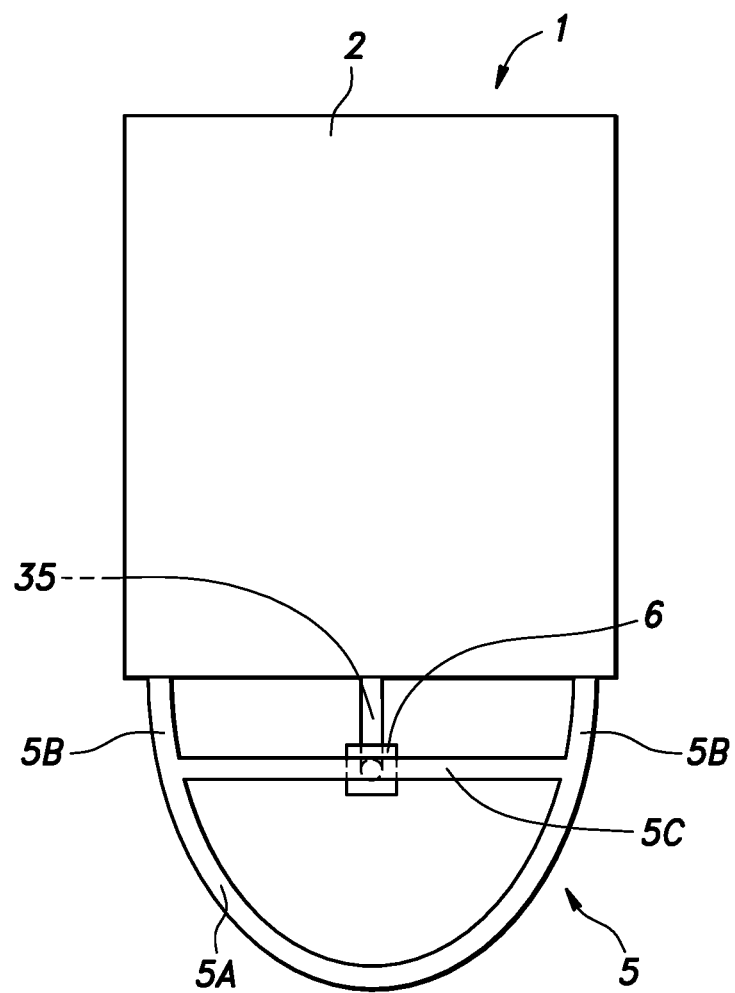

CART

TECHNICAL FIELD

The present invention relates to a cart of great convenience.

BACKGROUND ART

Conventionally, a cart including omnidirectional wheels is known (for example, JP2013-503778A). Such a cart can travel in a narrow space. JP2013-503778A discloses a cart including a vehicle body, a plurality of omnidirectional wheels configured to move the vehicle body in all directions along a floor, a motor device configured to drive each omnidirectional wheel, a handle to be gripped by a user, and a control unit configured to control the motor device based on a load applied to the handle. The handle of this cart includes a pair of support pillars extending upward from lateral ends of a rear portion of the vehicle body, and a grip extending in the width direction of the vehicle body between upper ends of the pair of support pillars. As the user applies the load to the grip of the handle in a desired travel direction, the omnidirectional wheel is driven by the motor device so as to assist the movement of the cart according to the load. Accordingly, the user can move the cart in the desired direction along the floor without any effort.

However, the handle (grip) of the cart described in JP2013-503778A is not suitable for pushing and pulling the cart in the width direction, even though it may be suitable for pushing and pulling the cart in the front-and-rear direction.

SUMMARY OF THE INVENTION

In view of the above background, an object of the present invention is to provide a cart that can be easily operated in the width direction.

To achieve such an object, one aspect of the present invention provides a cart (1), comprising: a vehicle body (2); at least one omnidirectional wheel (3) provided at the vehicle body (2) and configured to move the vehicle body (2) in all directions along a floor; a drive unit (4) configured to drive the omnidirectional wheel (3); a handle (5) provided at the vehicle body (2) and configured to accept an operation by a user; at least one sensor (6) configured to detect loads in a width direction and a front-and-rear direction of the vehicle body (2) applied to the handle (5); and a control unit (7) configured to control the drive unit (4) based on the loads detected by the sensor (6), wherein the handle (5) includes a first portion (5A) extending in the width direction and at least one second portion (5B) extending in a front-and-rear direction.

According to this aspect, it is possible to provide a cart that can be easily operated in the width direction. The user can easily move the cart in the width direction by operating the second portion.

In the above aspect, preferably, the at least one second portion (5B) comprises a pair of second portions (5B) spaced from each other in the width direction.

According to this aspect, the user can properly operate the cart by grasping either of the second portions, so that the operability of the handle can be improved. Further, the second portions can also be used to operate the cart from a lateral side thereof.

In the above aspect, preferably, at least two of the first portion (5A) and the pair of second portions (5B) are arranged at the same height.

According to this aspect, the operability of the handle can be further improved.

In the above aspect, preferably, the first portion (5A) and the second portions (5B) are directly connected to each other and coupled to the vehicle body via a common member.

According to this aspect, the operability of the handle can be further improved. Further, the loads applied to the first portion and the second portions can be detected by using a single sensor.

In the above aspect, preferably, the first portion (5A) of the handle (5) is arranged more rearward than a rear end of the vehicle body (2).

According to this aspect, the operability of the handle can be further improved.

In the above aspect, preferably, the handle (5) includes a connecting portion (5C) extending in the width direction and connecting the second portions (5B) to each other, the first portion (5A) connects the second portions (5B) to each other, or is coupled to the connecting portion (5C), and the connecting portion (5C) is connected to the vehicle body (2) via the sensor (6).

According to this aspect, a portion that connects the handle to the vehicle body is provided at a portion other than a portion to be operated by the user. Accordingly, the operation of the handle is not prevented.

In the above aspect, preferably, the first portion (5A) extends, at a rear side of a rear end of the vehicle body (2), to positions inside lateral ends of the vehicle body (2), the second portions (5B) extend, at an inside of the lateral ends of the vehicle body (2), forward from lateral ends of the first portion (5A), and a laterally middle portion of the first portion (5A) is connected to the vehicle body (2) via the sensor (6).

According to this aspect, the structure can be simplified and the operability of the handle can be further improved.

In the above aspect, preferably, the first portion (5A) extends, at a rear side of a rear end of the vehicle body (2), to positions inside lateral ends of the vehicle body (2), the second portions (5B) extend, at an inside of the lateral ends of the vehicle body (2), forward from lateral ends of the first portion (5A), front-and-rear middle portions of the second portions (5B) are connected to each other by a connecting portion (5C) extending laterally, and the connecting portion (5C) is connected to the vehicle body (2) via the sensor (6).

According to this aspect, the structure can be simplified and the operability of the handle can be further improved.

In the above aspect, preferably, in a plan view, the center of gravity (G) of the cart (1) is arranged more rearward than a front end of the second portion (5B) and more forward than a rear end of the second portion (5B).

According to this aspect, the distance between the center of gravity of the cart and the handle becomes relatively short, so that the user can cause the cart to travel via the handle without any discomfort.

In the above aspect, preferably, in a plan view, the whole of the omnidirectional wheel (3) is arranged more rearward than a front end of the second portion (5B) and more forward than a rear end of the second portion (5B).

According to this aspect, since the structure of the cart can be made compact, so that the user can easily cause the cart to travel via the handle. Further, the user can cause the cart to travel via the handle without any discomfort.

In the above aspect, preferably, the vehicle body (2) includes a stopper (39) configured to regulate a displacement range of the handle (5) in the front-and-rear direction and a lateral direction.

According to this aspect, it is possible to prevent an excessive load from being applied to the sensor.

In the above aspect, preferably, the stopper (39) is configured to regulate the displacement range of a front end of the second portion (5B).

According to this aspect, it is possible to prevent an excessive load from being applied to the sensor without losing the operability of the handle.

In the above aspect, preferably, front ends of the second portions (5B) reach a front side of a front end of the vehicle body (2), and are connected to each other by a third portion (5E) extending in a lateral direction.

According to this aspect, the whole of the handle is formed in an endless shape. Accordingly, the user can easily cause the cart to travel via the handle regardless of the positional relationship between the user and the cart in the front-and-rear direction and width direction.

In the above aspect, preferably, the at least one sensor (6) includes a first sensor (6A) configured to detect the loads in the width direction and the front-and-rear direction of the vehicle body (2) applied to one of the second portions (5B) and a second sensor (6B) configured to detect the loads in the width direction and the front-and-rear direction of the vehicle body (2) applied to another of the second portions (5B), and the control unit (7) is configured to control the drive unit (4) based at least on the loads detected by the first sensor (6A) and the loads detected by the second sensor (6B).

According to this aspect, when the loads are applied to a plurality of positions of the handle, these loads can be detected individually.

Effect of the Invention

Thus, according to the above aspects, it is possible to provide a cart that can be easily operated in the width direction.

BRIEF DESCRIPTION OF THE DRAWING(S)

FIG. 8 is a schematic plan view showing a fourth modified embodiment of the handle of the cart; and FIG. 9 is a schematic plan view showing a fifth modified embodiment of the handle of the cart.

DETAILED DESCRIPTION OF THE INVENTION

In the following, an embodiment of a cart 1 according to the present invention will be described with reference to FIGS. 1 to 4. Hereinafter, each direction is defined based on the cart 1.

Figure 1:
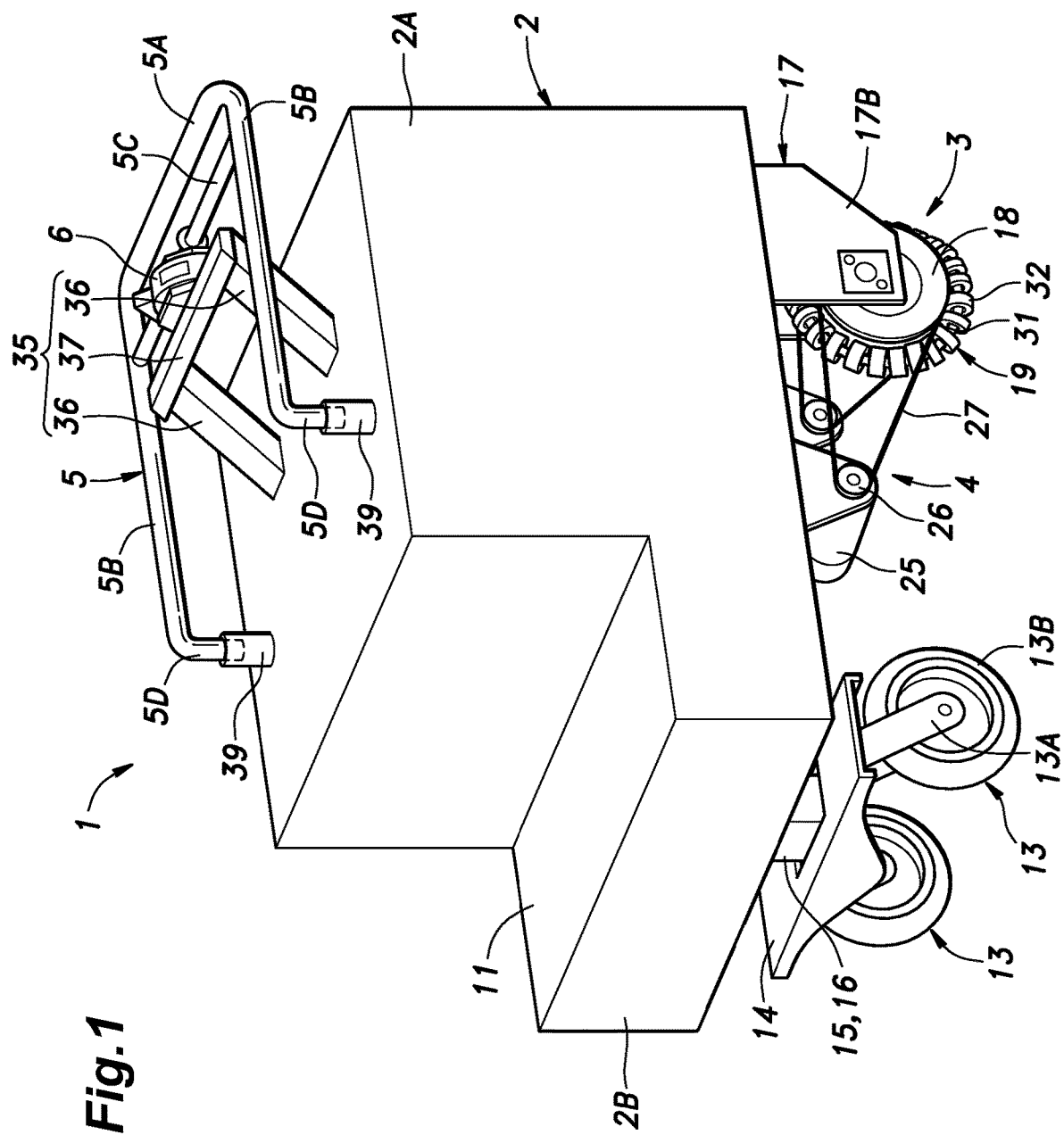
FIG. 1 is a perspective view of a cart according to an embodiment of the present invention.
Figure 2:
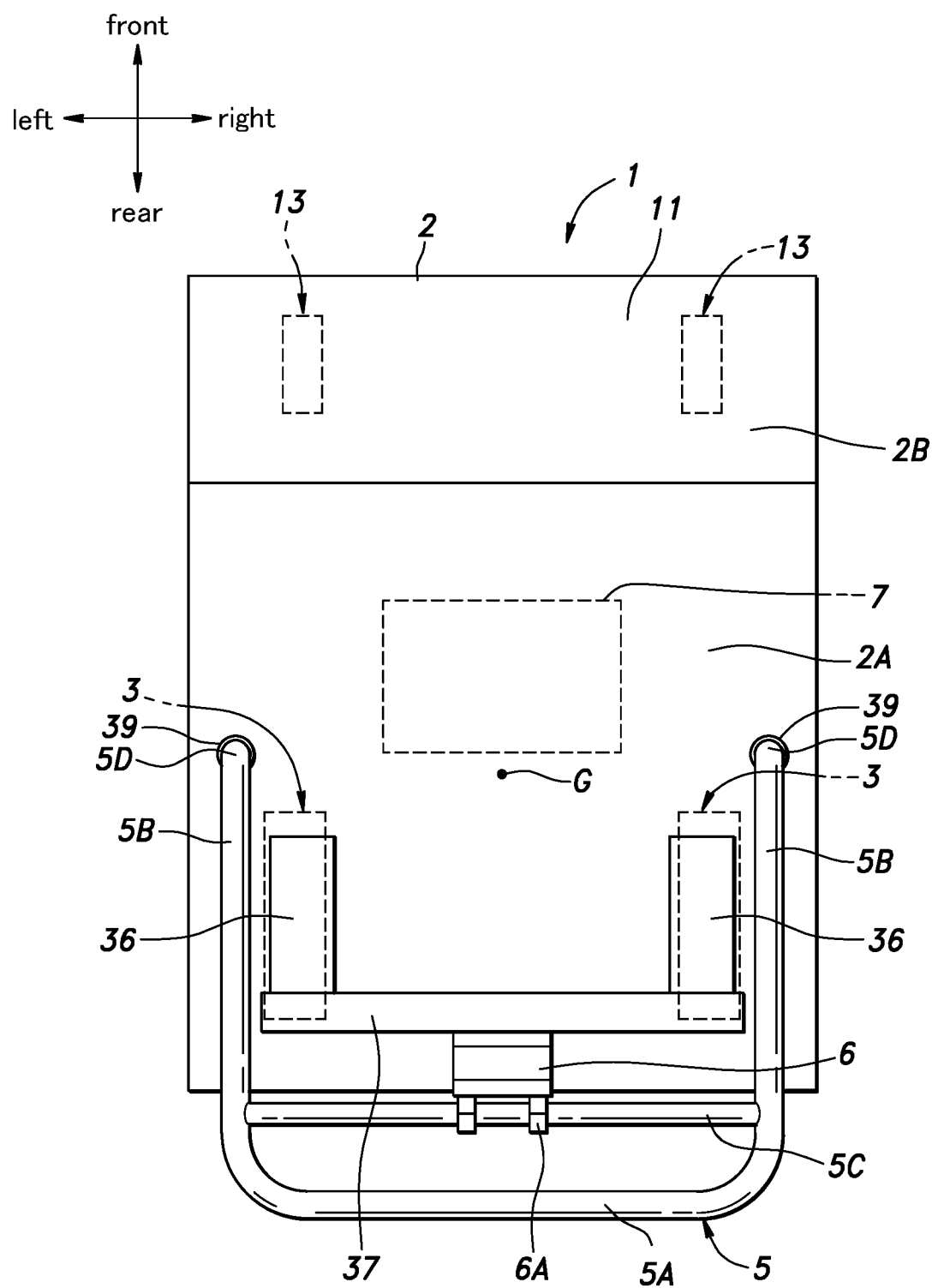
FIG. 2 is a plan view of a cart.

As shown in FIGS. 1 and 2, a cart 1 includes a vehicle body 2, at least one omnidirectional wheel 3 provided at the vehicle body 2 and configured to move the vehicle body 2 in all directions along a floor, a drive unit 4 configured to drive each omnidirectional wheel 3, a handle 5 provided at the vehicle body 2 and configured to accept an operation by a user, a load sensor 6 configured to detect a load applied to the handle 5, and a control unit 7 configured to control the drive unit 4 based on the load detected by the load sensor 6.

The vehicle body 2 extends in the front and rear direction. A rear part 2A of the vehicle body 2 extends more upward than a front part 2B thereof. The front part 2B of the vehicle body 2 is provided with a support base 11 for supporting other devices. The devices supported by the support base 11 include, for example, inspection equipment such as an X-ray scanner. The devices may be fastened to the support base 11. The control unit 7, a battery, and various sensors may be provided inside the rear part 2A of the vehicle body 2.

In a laterally middle portion of a rear portion on an upper surface of the rear part 2A of the vehicle body 2, a handle holder 35 extending substantially upward is provided. The handle holder 35 includes a pair of support pillars 36 and a lateral member 37. The pair of support pillars 36 extend upward while tilting rearward from laterally symmetrical positions of the rear part 2A of the vehicle body 2. The laterally symmetrical positions are spaced from each other in a lateral direction. The lateral member 37 extends between upper ends of both support pillars 36 along the width direction of the vehicle body 2.

In the present embodiment, a pair of omnidirectional wheels 3 are provided at a lower portion of the rear part 2A of the vehicle body 2. Further, left and right casters 13 are supported by a lower portion of the front part 2B of the vehicle body 2 via a suspension. The suspension includes an arm 14, a spring 15, and a shock absorber 16. The arm 14 is arranged below the vehicle body 2 and extends in the lateral direction. The spring 15 and the shock absorber 16 are arranged between the vehicle body 2 and the arm 14. Each caster 13 is arranged below lateral ends of the arm 14. Each caster 13 includes a fork 13A coupled to the arm 14 so as to rotate around an axis extending in the up-and-down direction, and a wheel 13B supported by the fork 13A so as to rotate around an axis extending in the horizontal direction. The fork 13A rotates freely with respect to the arm 14, and the wheel 13B rotates freely with respect to the fork 13A.

Figure 3:
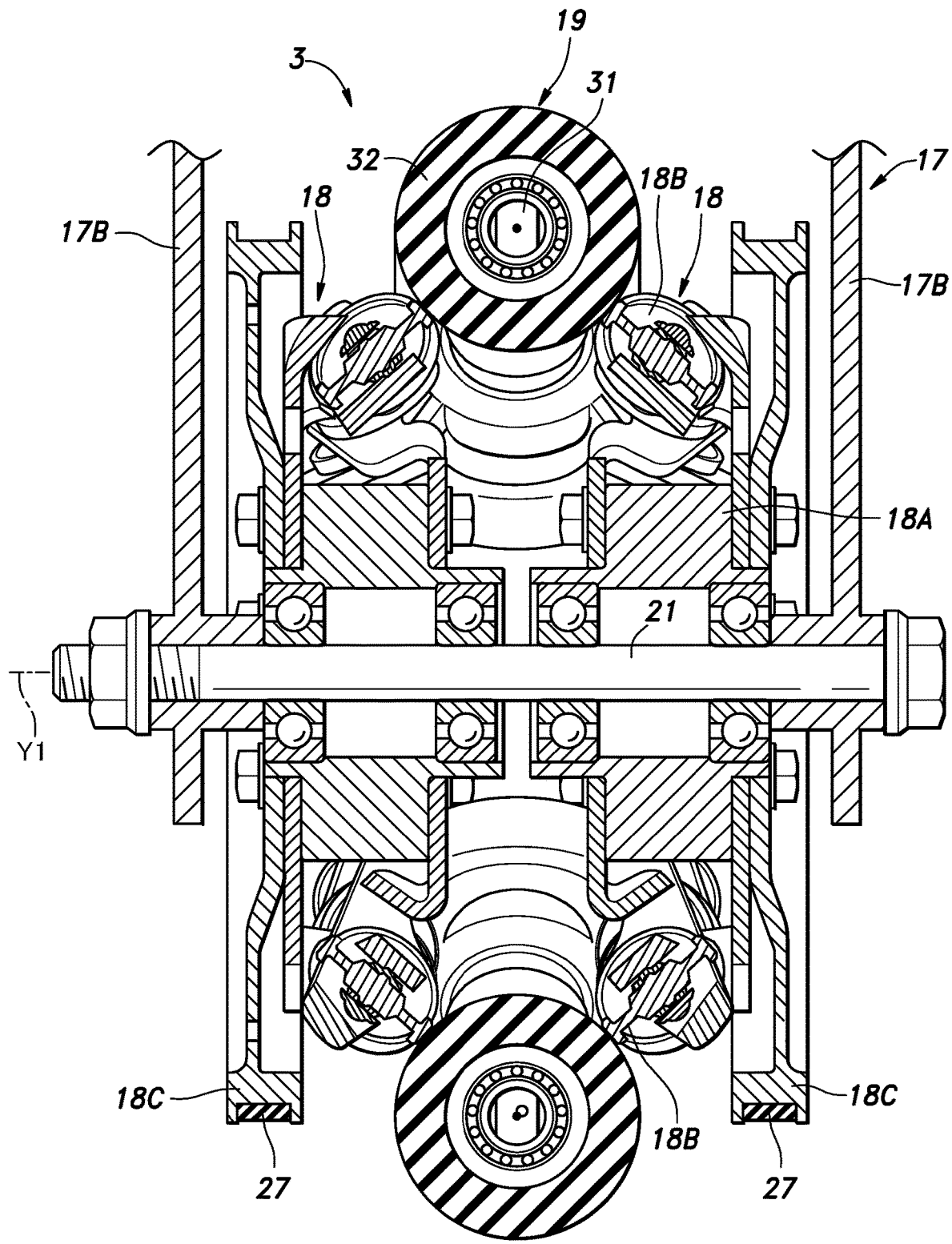
FIG. 3 is a cross-sectional view of a main wheel of the cart.

As shown in FIG. 2, the pair of omnidirectional wheels 3 are arranged at an interval in the lateral direction. In the present embodiment, the pair of omnidirectional wheels 3 is arranged on a lower left side and a lower right side of the rear part 2A of the vehicle body 2. As shown in FIG. 3, each omnidirectional wheel 3 includes a frame 17, a pair of drive disks 18 rotatably supported by the frame 17, and an annular main wheel 19 arranged between the pair of drive disks 18.

As shown in FIGS. 1 and 3, the frame 17 includes an upper frame (not shown) coupled to a lower portion of the vehicle body 2, and a pair of side frames 17B extending downward from lateral ends of the upper frame. Between lower ends of the pair of side frames 17B, a support shaft 21 extending in the lateral direction is provided. The pair of drive disks 18 are rotatably supported by the support shaft 21. The pair of drive disks 18 is configured to rotate around an axis Y1 of the support shaft 21. The lateral position of each drive disk 18 is regulated (fixed) with respect to the support shaft 21. Drive disks 18 face each other at an interval in the lateral direction.

The drive disks 18 are respectively arranged on both lateral sides of the annular main wheel 19, and configured to apply a frictional force to the main wheel 19 so as to rotate the main wheel 19 around a central axis and an annular axis.

Each drive disk 18 includes a disk-shaped hub 18A rotatably supported by the frame 17 and drive rollers 18B rotatably supported by an outer circumferential portion of the hub 18A. The drive rollers 18B are inclined with respect to each other, and come into contact with the main wheel 19. The hub 18A is arranged coaxially with the support shaft 21.

Each drive disk 18 has an opposite surface. The opposite surface of one drive disk 18 faces away from the opposite surface of the other drive disk 18. A driven pulley 18C is provided on the opposite surface of each drive disk 18. The driven pulley 18C is provided coaxially with the drive disk 18. The drive unit 4 is provided at a lower portion of the vehicle body 2. The drive unit 4 includes a plurality of electric motors 25 corresponding to the respective drive disks 18. In the present embodiment, four electric motors 25 are provided so as to correspond to the four drive disks 18. A drive pulley 26 is provided on an output shaft of each electric motor 25. The drive pulley 26 and the driven pulley 18C, which correspond to each other, are connected by a belt 27. As each electric motor 25 rotates independently of each other, each drive disk 18 rotates independently of each other.

Figure 4:
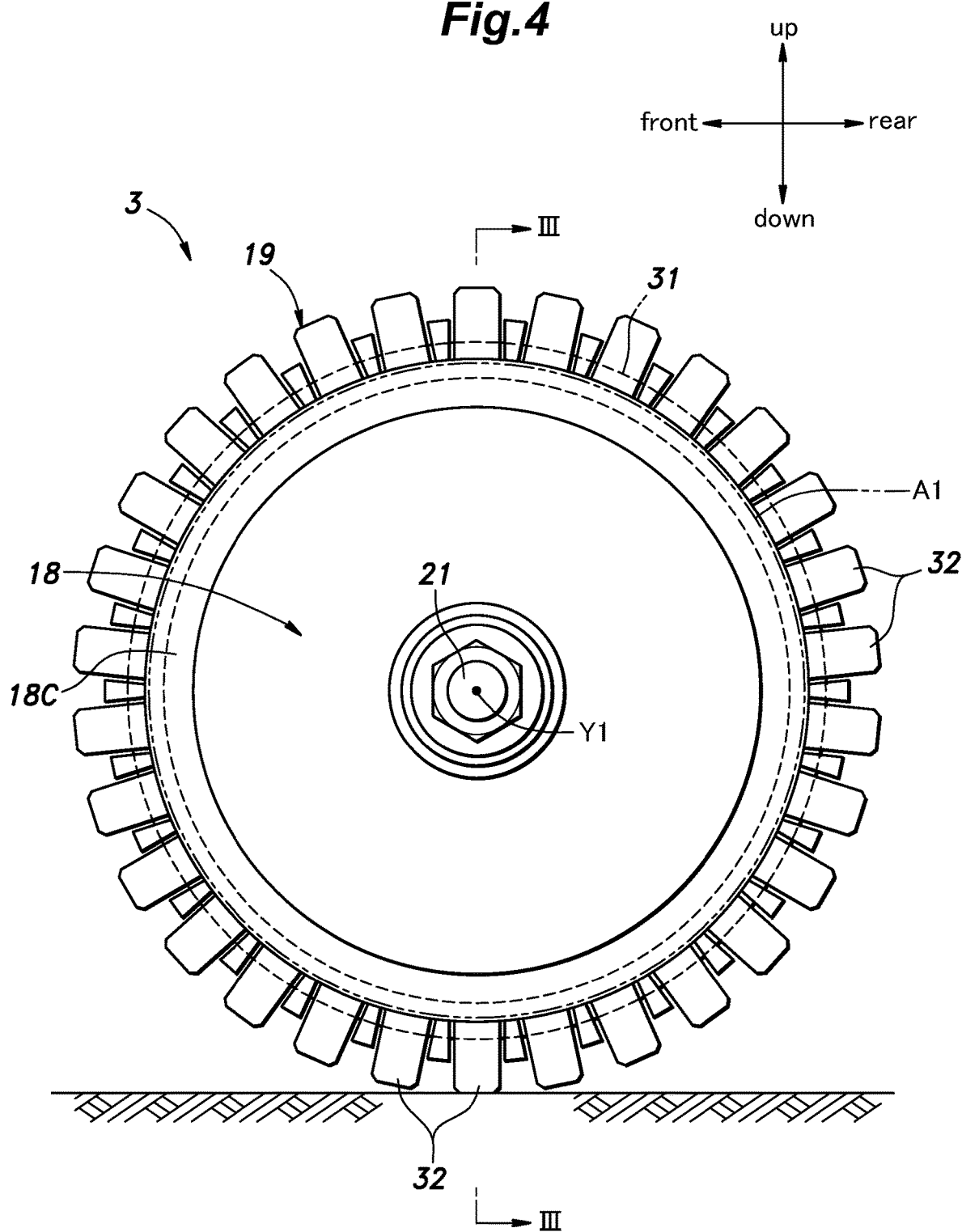
FIG. 4 is a side view of an omnidirectional wheel of the cart.
Figure 5:
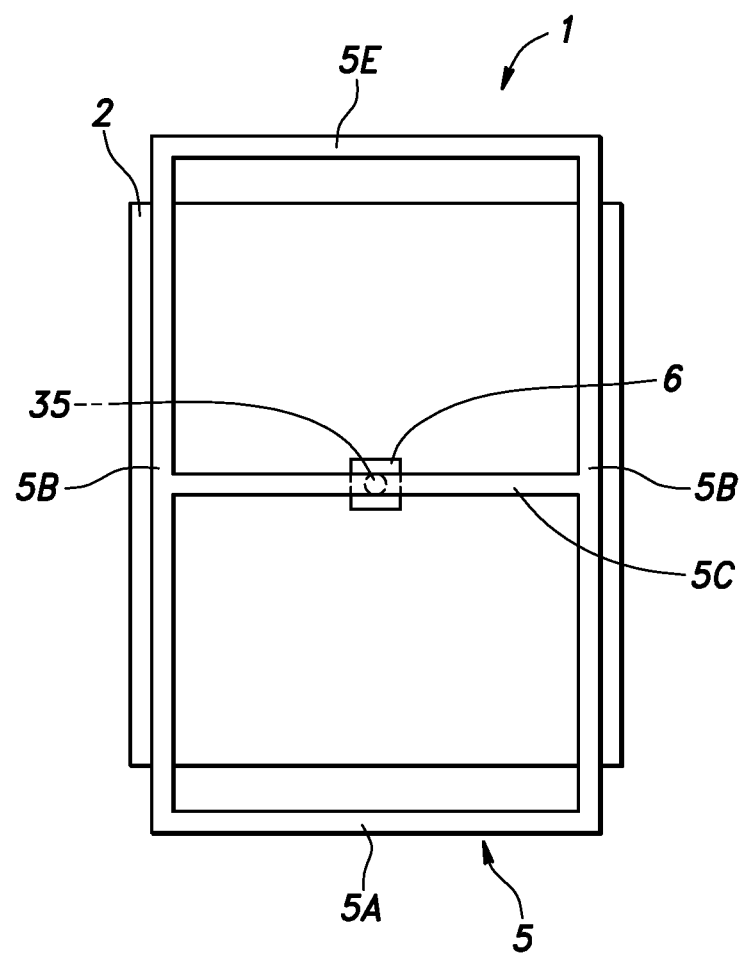
FIG. 5 is a schematic plan view showing a first modified embodiment of a handle of the cart.

As shown in FIG. 4, the main wheel 19 has an annular shape, and is arranged between the pair of drive disks 18 so as to be coaxial therewith. The main wheel 19 comes into contact with the drive rollers 18B, and can rotate around the central axis and the annular axis. The main wheel 19 includes an annular member 31 and a plurality of driven rollers 32 rotatably supported by the annular member 31. The plurality of driven rollers 32 is arranged at equal intervals in the circumferential direction of the annular member 31. Each driven roller 32 is supported by the annular member 31 so as to rotate around an axis A1 (annular axis) of the annular member 31. More specifically, each driven roller 32 can rotate around the tangent of the annular member 31 at the respective position with respect to the annular member 31. Upon receiving an external force, each driven roller 32 rotates with respect to the annular member 31.

The main wheel 19 is arranged along outer circumferential portions of the pair of drive disks 18, and comes into contact with the plurality of drive rollers 18B of each drive disk 18. The drive rollers 18B of each drive disk 18 come into contact with an inner circumferential portion of the main wheel 19, thereby holding the main wheel 19 from both lateral sides thereof. Further, the drive rollers 18B of the left and right drive disks 18 come into contact with the inner circumferential portion of the main wheel 19, thereby regulating (suppressing) the displacement of the drive disks 18 in the radial direction around the axis Y1. Accordingly, the main wheel 19 is supported by the left and right drive disks 18, and the central axis of the main wheel 19 (the annular member 31) is arranged coaxially with the axis Y1 of the left and right drive disks 18. The plurality of driven rollers 32 of the main wheel 19 comes into contact with the plurality of drive rollers 18B of the left and right drive disks 18.

According to each omnidirectional wheel 3, in a case where the pair of drive disks 18 rotate in the same direction at the same rotational speed, the main wheel 19 rotates together with the pair of drive disks 18. That is, the main wheel 19 rotates forward or rearward around its own rotational axis which matches the axis Y1. At this time, the drive rollers 18B of the drive disks 18 and the driven rollers 32 of the main wheel 19 do not rotate with respect to the annular member 31. According to each omnidirectional wheel 3, in a case where there is a difference in rotational speeds of the pair of drive disks 18, a component force is applied from the drive rollers 18B of the left and right drive disks 18 to the driven rollers 32 of the main wheel 19. The component force is a force in a direction perpendicular to a force in the circumferential direction (tangential direction) caused by the rotation of the pair of drive disks 18. Since the axis of each drive roller 18B is inclined with respect to the circumferential direction of the drive roller 18B (the drive disks 18), the component force is generated due to the difference in the rotational speeds of the pair of drive disks 18. Owing to this component force, the drive rollers 18B rotate with respect to the hub 18A and the driven rollers 32 rotate with respect to the annular member 31. Accordingly, the main wheel 19 generates a driving force in the lateral direction.

The cart 1 moves forward as the left and right omnidirectional wheels 3 rotate forward at the same speed. The cart 1 moves rearward as the left and right omnidirectional wheels 3 rotate rearward at the same speed. The cart 1 turns to the right or left as a speed difference is generated in the front-and-rear rotation of the left and right omnidirectional wheels 3. The cart 1 translates to the right or left as the driven rollers 32 of the main wheel 19 of the left and right omnidirectional wheels 3 rotate.

Next, the handle 5 according to the present embodiment will be described in detail with reference to FIGS. 1 and 2. In the present embodiment, the vehicle body 2 has a rectangular shape elongated in the front-and-rear direction in a plan view. The handle 5 includes a first portion 5A extending in the width direction and at least one second portion 5B extending in the front-and-rear direction. In the present embodiment, the at least one second portion 5B includes a pair of second portions 5B spaced from each other in the width direction. The first portion 5A may be arranged more rearward than a rear edge (rear end) of the vehicle body 2. In the present embodiment, the first portion 5A is arranged along the rear edge of the vehicle body 2, and extends horizontally in the lateral direction at a rear and upper side of the vehicle body 2. Lateral ends of the first portion 5A are arranged at an inside of side edges of the vehicle body 2 in the lateral direction. The first portion 5A and the second portions 5B may be directly connected to each other. In the present embodiment, the second portions 5B extend horizontally forward from the lateral ends of the first portion 5A. Front ends of the second portions 5B are arranged substantially in the center of the vehicle body 2 in the front-and-rear direction, and are arranged at positions that substantially match each other in the front-and-rear direction. The second portions 5B are arranged substantially parallel to each other, while the first portion 5A and the second portions 5B are arranged substantially perpendicular to each other.

At least two of the first portion 5A and the two second portions 5B may be arranged at the same height. In the present embodiment, the first portion 5A and both second portions 5B are arranged at substantially the same height. Alternatively, the first portion 5A may be arranged higher than the second portions 5B or lower than the second portions 5B. At least a portion of the handle 5 may incline with respect to a vertical axis.

An extending portion 5D extends downward from a front end of each second portion 5B toward an upper surface of the rear part 2A of the vehicle body 2. The vehicle body 2 may include stoppers 39 configured to regulate a displacement range of the handle 5 in the front-and-rear direction and the lateral direction. Further, each stopper 39 may regulate the displacement range of a front end of the corresponding second portion 5B. In the present embodiment, the stopper 39 is arranged on an upper surface of the rear part 2A of the vehicle body 2, and provided at a position corresponding to the extending portion 5D in the up-and-down direction. The stopper 39 consists of a cylinder that defines a recess opening upward. The recess of the stopper 39 receives a lower end of the extending portion 5D. A gap having a prescribed distance (width) is provided between an inner circumferential surface of the stopper 39 and an outer circumferential surface of the extending portion 5D. Accordingly, the displacement of the extending portion 5D of each second portion 5B in the front-and-rear direction and the lateral direction is regulated to be equal to or less than the prescribed distance.

Further, the handle 5 includes a connecting portion 5C extending in the width direction and connecting the second portions 5B to each other. The connecting portion 5C connects the second portions 5B to each other at positions more forward than the first portion 5A, and extends parallel to the first portion 5A. In another embodiment, the first portion 5A may be attached to the connecting portion 5C. For example, lateral ends of the connecting portion 5C may be respectively bent rearward, and coupled to the first portion 5A at positions inside both ends thereof.

The connecting portion 5C should be coupled to the vehicle body 2 via the load sensor 6. In the present embodiment, a laterally middle portion of the lateral member 37 of the handle holder 35 of the vehicle body 2 is connected to a laterally middle portion of the connecting portion 5C via the load sensor 6. Thus, the load sensor 6 can detect the magnitude and direction of the operation force (load) applied to the handle 5 by the user. In another embodiment, the laterally middle portion of the first portion 5A may be coupled to the vehicle body 2 via the load sensor 6.

The load sensor 6 may consist of a two-axis load sensor that detects a load along two axes perpendicular to each other on a horizontal plane. The load sensor 6 of the present embodiment is configured to detect a front-and-rear load and a lateral load. The front-and-rear load is a load in the front-and-rear direction (x-axis direction) applied to the handle 5. The lateral load is a load in the lateral direction (y-axis direction) applied to the handle 5. In another embodiment, the load sensor 6 may further detect a moment around a vertical axis (z-axis).

The control unit 7 is configured to control the drive unit 4 based on a signal from the load sensor 6. The control unit 7 may determine the traveling direction and speed of the vehicle body 2 based on the signal from the load sensor 6, and determine a control amount of each electric motor 25 of the drive unit 4 based on the determined traveling direction and speed of the vehicle body 2.

Next, the procedure for operating the cart 1 according to the present embodiment will be described in detail. The user may operate the handle 5 while standing behind the cart 1 or on a lateral side of the cart 1. When moving the cart 1 in the front-and-rear direction, the user may push and pull the first portion 5A in the front-and-rear direction. When moving the cart 1 in the width direction, the user may push or pull either second portion 5B in the width direction. The load in the front-and-rear direction or the width direction applied to the first portion 5A or either second portion 5B is detected by the load sensor 6, and the drive unit 4 drives the cart 1 in the corresponding direction based on the detection result thereof. The user may push and pull the first portion 5A in the width direction or push and pull either second portion 5B in the front-and-rear direction. Since the second portions 5B are spaced from each other in the width direction, the user can intuitively operate the handle 5 with his/her left or right hand without any discomfort. Further, the second portions 5B extend so as to reach at least a middle portion of the vehicle body 2, so that the user can also operate either second portion 5B from a front side of the cart 1.

Next, with reference to FIG. 2, the arrangement of each omnidirectional wheel 3 with respect to the handle 5 and the center of gravity G of the cart 1 will be described. The whole of the omnidirectional wheel 3 is arranged more rearward than a front end of each second portion 5B and more forward than a rear end of the second portion 5B. Accordingly, the structure of the cart 1 can be made compact, so that the user can easily cause the cart 1 to travel via the handle 5. Further, in a plan view, the distance between the omnidirectional wheel 3 and the position (namely, the first portion 5A and/or either second portion 5B) where the user applies a load to the handle 5 becomes relatively short. Accordingly, the user can cause the cart 1 to travel via the handle 5 without any discomfort.

The center of gravity G of the cart 1 may be arranged more rearward than a front end of the second portion 5B and more forward than a rear end of the second portion 5B. In the present embodiment, the center of gravity G of the cart 1 is arranged between both second portions 5B in the width direction, and is arranged more rearward than the front end of each second portion 5B and more forward than the rear end of the second portion 5B. Accordingly, in a plan view, the distance between the center of gravity G and the position (namely, the first portion 5A and/or either second portion 5B) where the user applies the load to the handle 5 becomes relatively short, and thus the load efficiently contributes to the movement of the cart 1. Accordingly, the user can cause the cart 1 to travel via the handle 5 without any discomfort. Further, in a plan view, the distance in the front-and-rear direction between the center of gravity G of the cart 1 and the first portion 5A may be relatively short. Accordingly, when the user moves the cart 1 in the front-and-rear direction, the moment around the vertical axis (z-axis) acting on the cart 1 becomes small, so that the user can easily cause the cart 1 to travel via the handle 5.

Next, the effect of the cart 1 according to the present embodiment will be described in detail. The first portion 5A and the second portions 5B of the handle 5 are arranged at the same height, so that the operability of the handle 5 can be improved. Further, the first portion 5A is arranged more rearward than the rear edge of the vehicle body 2, so that the operability of the handle 5 can be further improved. Further, the first portion 5A and the second portions 5B are directly connected to each other, and coupled to the vehicle body 2 via the connecting portion 5C (common member), so that the operability of the handle 5 can be further improved. Further, the loads applied to the first portion 5A and the second portions 5B are detected by using a single load sensor 6. Accordingly, the number of load sensors 6 is reduced, and the assembly and wiring thereof become relatively easy.

The load sensor 6 is provided between the lateral member 37 of the handle holder 35 extending from the vehicle body 2 and the connecting portion 5C of the handle 5. Accordingly, a portion that connects the handle 5 to the vehicle body 2 is provided in a portion other than a portion to be operated by the user, and thus the operation of the handle 5 is not prevented by the load sensor 6. Accordingly, the operability of the handle 5 can be further improved.

Further, the displacement range of the handle 5 in the front and rear direction and the lateral direction is regulated by the stoppers 39. Accordingly, the handle 5 does not displace beyond the prescribed distance even when an excessive load is applied to the handle 5, and thus it is possible to prevent an excessive load from being applied to the load sensor 6. In the present embodiment, since the front ends of the second portions 5B can be displaced more largely in the front—and rear direction and the lateral direction than the other portions of the handle 5, the displacement range of the handle 5 is more effectively regulated. Accordingly, it is possible to more effectively prevent an excessive load from being applied to the load sensor 6.

Next, with reference to FIGS. 5 to 9, a plurality of modified embodiments of the cart 1 according to the present invention will be described. The handle 5 of the cart 1 according to a first modified embodiment shown in FIG. 5 includes a first portion 5A and a pair of second portions 5B. The first portion 5A is arranged along a rear edge (rear end) of the vehicle body 2, and extends horizontally in the lateral direction at a rear and upper side of the vehicle body 2. Lateral ends of the first portion 5A are arranged at an inside of side edges of the vehicle body 2. The second portions 5B are arranged at an inside of the side edges of the vehicle body 2 and an upper side of the vehicle body 2, and extend horizontally in the front and rear direction from lateral ends of the first portion 5A. The front ends of the second portions 5B reach the front of the front edge of the vehicle body 2, and are connected to each other by a third portion 5E extending in the lateral direction. The third portion 5E extends horizontally in the lateral direction at a front and upper side of the vehicle body 2 along the front edge of the vehicle body 2. The handle 5 further includes a connecting portion 5C that connects the front-and-rear central portions of the second portions 5B to each other, and extends horizontally in the lateral direction. The first portion 5A, the second portions 5B, the third portion 5E, and the connecting portion 5C are all arranged at substantially the same height. The first portion 5A, the third portion 5E, and the connecting portion 5C are arranged substantially parallel to each other. The second portions 5B are arranged substantially parallel to each other. The second portions 5B are arranged approximately perpendicular to the first portion 5A, the third portion 5E, and the connecting portion 5C. The whole of the handle 5 is formed in a rectangular and endless shape in a plan view.

A load sensor 6 is provided in a laterally middle portion of the connecting portion 5C. The load sensor 6 is coupled to a handle holder 35 extending substantially upward from an upper surface of the vehicle body 2. The load sensor 6 is provided between the vehicle body 2 and the handle 5, thereby detecting the load applied to the handle 5.

In the cart 1 according to the first modified embodiment, the user can easily operate the cart 1 via the handle 5 regardless of the positional relationship in the front-and-rear direction and the width direction between the user and the cart 1.

Figure 6:
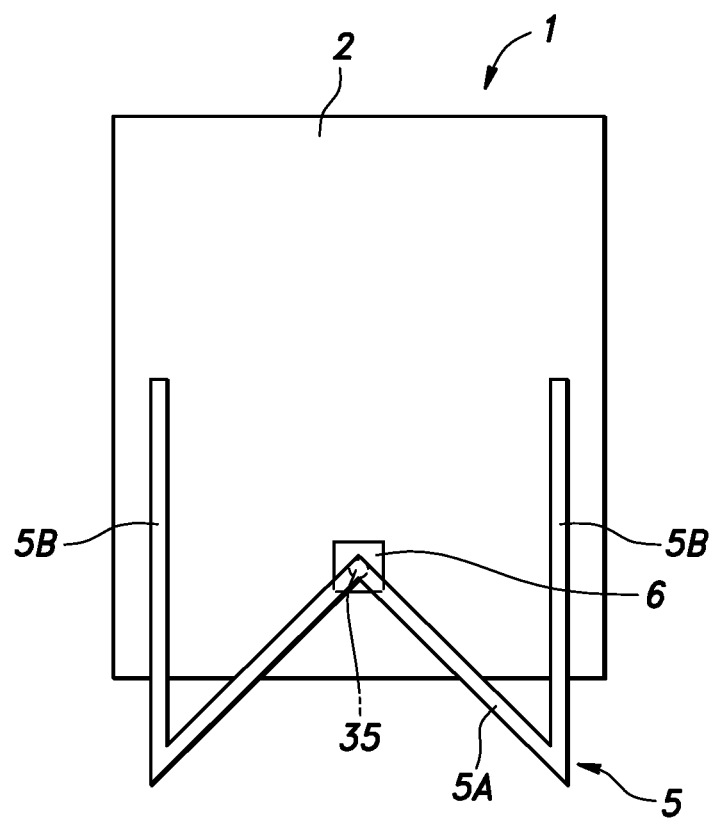
FIG. 6 is a schematic plan view showing a second modified embodiment of the handle of the cart.

The handle 5 of the cart 1 according to a second modified embodiment shown in FIG. 6 includes a first portion 5A and a pair of second portions 5B. The first portion 5A consists of two straight portions extending diagonally from a laterally central portion arranged on a front side of a rear edge of the vehicle body 2 to outsides in the lateral direction and a rear side. Lateral ends of straight portions are arranged at an inside of side edges of the vehicle body 2 and a rear side of the rear edge of the vehicle body 2. The second portions 5B extend horizontally forward from lateral ends of the first portion 5A at an inside of the side edges of the vehicle body 2. The second portions 5B reach the front-and-rear middle portion of the vehicle body 2. The second portions 5B are arranged substantially parallel to each other. Accordingly, the handle 5 is formed in a substantially M-shape inverted in the front-and-rear direction in a top view.

The load sensor 6 is provided on a laterally central portion of the first portion 5A. The load sensor 6 is coupled to a handle holder 35 extending substantially upward from an upper surface of the vehicle body 2. The load sensor 6 is provided between the vehicle body 2 and the handle 5, thereby detecting the load applied to the handle 5.

In the cart 1 according to the second modified embodiment, a laterally central portion of the first portion 5A is arranged more forward than a rear edge of the cart 1, and lateral ends of the first portion 5A are arranged more rearward than the rear edge of the cart 1. Accordingly, the user can easily operate the cart 1 via the handle 5 at a rear side of the cart 1.

Figure 7:
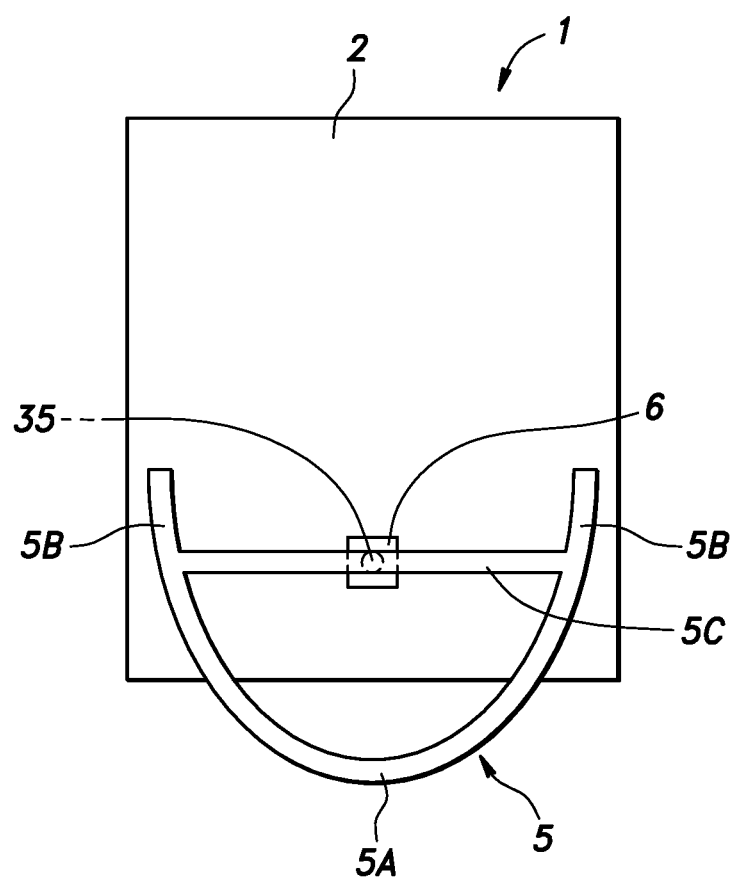
FIG. 7 is a schematic plan view showing a third modified embodiment of the handle of the cart.

The handle 5 of the cart 1 according to a third modified embodiment shown in FIG. 7 includes a first portion 5A and a pair of second portions 5B. The first portion 5A extends horizontally in the lateral direction while curving forward from a laterally central portion arranged on a rear side of a rear edge of the vehicle body 2 to outsides in the lateral direction. Lateral ends of the first portion 5A are arranged at a front side of a rear edge of the vehicle body 2 and at an inside of side edges of the vehicle body 2. The second portions 5B extend horizontally forward from the lateral ends of the first portion 5A while curving inward in the lateral direction at an inside of the side edges of the vehicle body 2. The second portions 5B reach the front-and-rear middle portion of the vehicle body 2. Accordingly, the handle 5 is formed in a substantially U shape in a top view.

The handle 5 further includes a connecting portion 5C connecting the front-and-rear middle portions of the second portions 5B to each other and extending horizontally in the lateral direction along a rear edge of the vehicle body 2. A load sensor 6 is connected to a laterally middle portion of the connecting portion 5C. The load sensor 6 is coupled to a handle holder 35 extending substantially upward from an upper surface of the vehicle body 2. The load sensor 6 is provided between the vehicle body 2 and the handle 5, thereby detecting the load applied to the handle 5.

In the cart 1 according to the third modified embodiment, the first portion 5A and the second portions 5B are connected smoothly. Accordingly, the user can relatively smoothly switch between the movement of the cart 1 using the first portion 5A and the movement of the cart 1 using the second portions 5B, so that the operability of the handle 5 can be improved.

The handle 5 of the cart 1 according to a fourth modified embodiment shown in FIG. 8 includes a pair of first portions 5A and a pair of second portions 5B. The first portions 5A extend horizontally while curving forward from laterally symmetrical positions to an outside in the lateral direction. The laterally symmetrical positions are spaced from each other at a rear side of a rear edge of the vehicle body 2. Each first portion 5A includes a laterally outside end arranged at a front side of the rear edge of the vehicle body 2 and at an inside of the side edges of the vehicle body 2. Each second portion 5B extends horizontally forward from the laterally outside end of the first portion 5A while curving inward in the lateral direction at an inside of the side edges of the vehicle body 2. The pair of second portions 5B reaches the front-and-rear middle portion of the vehicle body 2.

The cart 1 according to the fourth modified embodiment includes a plurality of load sensors 6. The control unit 7 is configured to control the drive unit 4 based on the loads detected by the respective load sensors 6. More specifically, the load sensors 6 include a first load sensor 6A (first sensor) configured to detect the loads in the width direction and the front-and-rear direction of the vehicle body 2 applied to one of the second portions 5B and a second load sensor 6B (second sensor) configured to detect the loads in the width direction and the front-and-rear direction of the vehicle body 2 applied to another of the second portions 5B. Further, the control unit 7 is configured to control the drive unit 4 based on the loads detected by the first load sensor 6A and the loads detected by the second load sensor 6B. For example, when the first load sensor 6A and the second load sensor 6B detect loads in laterally opposite directions, the control unit 7 controls the drive unit 4 so as to reduce the velocity in the lateral direction of the cart 1.

The first load sensor 6A is coupled to a front-and-rear middle portion of one second portion 5B, and the second load sensor 6B is coupled to a front-and-rear middle portion of the other second portion 5B. The first load sensor 6A and the second load sensor 6B are coupled to a pair of handle holders 35 corresponding thereto. The pair of handle holders 35 extend substantially upward from an upper surface of the vehicle body 2, respectively. The first load sensor 6A is provided between the vehicle body 2 and the one second portion 5B. The second load sensor 6B is provided between the vehicle body 2 and the other second portion 5B. Thus, the first load sensor 6A is configured to detect the load applied to the one second portion 5B and one first portion 5A corresponding thereto. Further, the second load sensor 6B is configured to detect the load applied to the other second portion 5B and the other first portion 5A corresponding thereto. As another modified embodiment, the load sensor 6 may further include a third load sensor (not shown) provided between the vehicle body 2 and one or both of the pair of first portions 5A. Further, the control unit 7 may control the drive unit 4 based on the load detected by the first load sensor 6A, the load detected by the second load sensor 6B, and the load detected by the third load sensor. Further, the first load sensor 6A and the second load sensor 6B may be pressure-sensitive sensors provided on the corresponding second portions 5B.

In the cart 1 according to the fourth modified embodiment, the load applied to the pair of second portions 5B can be individually detected by the first load sensor 6A and the second load sensor 6B. Accordingly, in a case where either of the second portions 5B comes into contact with an obstacle or the like, it is possible to prevent the cart 1 from applying excessive pressure to the obstacle or the user.

The handle 5 of the cart 1 according to a fifth modified embodiment shown in FIG. 9 includes a first portion 5A and a pair of second portions 5B. The first portion 5A extends horizontally in the lateral direction while curving forward from a laterally central portion arranged on a rear side on a rear edge of the vehicle body 2 to outsides in the lateral direction. Lateral ends of the first portion 5A end at a rear side of a rear edge of the vehicle body 2 and at an inside of side edges of the vehicle body 2. The second portions 5B extend forward from the lateral ends of the first portion 5A while curving horizontally inward in the lateral direction on an inside of the side edges of the vehicle body 2. The second portions 5B end right above the rear edge of the vehicle body 2. Accordingly, the handle 5 is formed in a substantially U shape in a top view.

The handle 5 further includes a connecting portion 5C that connects the front-and-rear middle portions of the second portions 5B to each other and extends horizontally in the lateral direction along a rear edge of the vehicle body 2. A load sensor 6 is coupled to a laterally middle portion of the connecting portion 5C. The load sensor 6 is coupled to a handle holder 35 extending upward while tilting rearward from a rear surface of the vehicle body 2. As another modified embodiment, the handle holder 35 may extend upward while tilting rearward from an upper surface of the vehicle body 2. The load sensor 6 is provided between the vehicle body 2 and the handle 5, thereby detecting the load applied to the handle 5.

In the cart 1 according to the fifth modified embodiment, the handle 5 is not arranged on an upper portion of the vehicle body 2, so that the cart 1 can support a larger device.

Concrete embodiments of the present invention have been described in the foregoing, but the present invention should not be limited by the foregoing embodiments and various modifications and alterations are possible within the scope of the present invention. For example, the second portions 5B of the handle 5 may extend in the front-and-rear direction at an outside of side edges of the vehicle body 2. Similarly, the first portion 5A or the third portion 5E of the handle 5 may extend at a rear side of a rear edge of the vehicle body 2 or at a front side of a front edge of the vehicle body 2. Accordingly, when the handle 5 collides with an obstacle, the cart 1 is automatically driven away from the obstacle.

The invention claimed is:

1. A cart, comprising:
a vehicle body;
at least one omnidirectional wheel provided at the vehicle body and configured to move the vehicle body in all directions along a floor;
a drive unit configured to drive the omnidirectional wheel;
a handle provided at the vehicle body and configured to accept an operation by a user;
at least one sensor configured to detect loads in a width direction and a front and rear direction of the vehicle body applied to the handle; and
a control unit configured to control the drive unit based on the loads detected by the sensor,
wherein the handle includes a first portion extending in the width direction, a pair of second portions extending horizontally forward from the lateral ends of the first portion, and a connecting portion extending in the width direction and connecting the second portions to each other, and
the connecting portion is connected to the vehicle body via the sensor.

2. The cart according to claim 1, wherein at least two of the first portion and the pair of second portions are arranged at the same height.

3. The cart according to claim 1, wherein the first portion and the second portions are directly connected to each other and coupled to the vehicle body via a common member.

4. The cart according to claim 1, wherein the first portion of the handle is arranged more rearward than a rear end of the vehicle body.

5. The cart according to claim 1, wherein in a plan view, the center of gravity of the cart is arranged more rearward than a front end of the second portion and more forward than a rear end of the second portion.

6. The cart according to claim 1, wherein in a plan view, the whole of the omnidirectional wheel is arranged more rearward than a front end of the second portion and more forward than a rear end of the second portion.

7. The cart according to claim 1, wherein the vehicle body includes a stopper configured to regulate a displacement range of the handle in the front-and-rear direction and a lateral direction.

8. The cart according to claim 7, wherein the stopper is configured to regulate the displacement range of a front end of the second portion.

9. The cart according to claim 1, wherein front ends of the second portions reach a front side of a front end of the vehicle body, and are connected to each other by a third portion extending in a lateral direction.

10. The cart according to claim 1, wherein the at least one sensor includes a first sensor configured to detect the loads in the width direction and the front-and-rear direction of the vehicle body applied to one of the second portions and a second sensor configured to detect the loads in the width direction and the front-and-rear direction of the vehicle body applied to another of the second portions, and the control unit is configured to control the drive unit based at least on the loads detected by the first sensor and the loads detected by the second sensor.

* * * * *